(12) United States Patent
Son et al.

(10) Patent No.: US 8,761,273 B2
(45) Date of Patent: Jun. 24, 2014

(54) METHOD FOR TRANSMITTING AND RECEIVING WIRELESS SIGNAL IN WIRELESS COMMUNICATION SYSTEM AND APPARATUS FOR THE SAME

(75) Inventors: Jung Bo Son, Daejeon (KR); Sok Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 22 days.

(21) Appl. No.: 13/615,372

(22) Filed: Sep. 13, 2012

(65) Prior Publication Data

US 2013/0136157 A1 May 30, 2013

(30) Foreign Application Priority Data

Nov. 29, 2011 (KR) ........................ 10-2011-0125794

(51) Int. Cl.
*H04L 27/00* (2006.01)
(52) U.S. Cl.
USPC ........... 375/259; 375/295; 375/316; 370/204; 370/206; 370/252
(58) Field of Classification Search
USPC .......... 375/259–260, 316, 342, 295; 370/206, 370/207, 210, 252, 204
See application file for complete search history.

(56) References Cited

U.S. PATENT DOCUMENTS

| | | | |
|---|---|---|---|
| 7,474,608 B2 | 1/2009 | Stephens et al. | |
| 7,499,470 B2 * | 3/2009 | Calvignac et al. | 370/474 |
| 7,995,672 B2 * | 8/2011 | Pare et al. | 375/267 |
| 8,040,960 B2 | 10/2011 | Lee et al. | |
| 2010/0023830 A1 * | 1/2010 | Wengerter et al. | 714/748 |
| 2010/0067568 A1 * | 3/2010 | Koslov et al. | 375/227 |
| 2011/0069778 A1 * | 3/2011 | Kim | 375/285 |
| 2013/0010853 A1 * | 1/2013 | Ibrahim et al. | 375/229 |

FOREIGN PATENT DOCUMENTS

| | | |
|---|---|---|
| KR | 10-2011-0115167 A | 10/2011 |
| WO | WO 2010/093815 A2 | 8/2010 |

OTHER PUBLICATIONS

"IEEE P802.11ac™/D1.1, Part 11: Wireless LAN Medium Access Control (MAC) and Physical Layer (PHY) specifications, Amendment 5: Enhancements for Very High Throughput for Operation in Bands below 6 GHz", 802.11 Working Group of the 802 Committee, Aug. 2011, IEEE.

* cited by examiner

*Primary Examiner* — Jean B Corrielus

(57) ABSTRACT

A method for receiving a data frame by a receive station in a wireless local area network (WLAN) system is provided. The method includes: receiving a signal A field including a multiple input multiple output (MIMO) indicator and including a first signal A sub-field and a second signal A sub-field each transmitted as different orthogonal frequency division multiplexing (OFDM) symbols; determining a processing type of a subsequently transmitted signal based on the signal A field; receiving a data field; and obtaining data by interpreting the data field based on the processing type of the signal. Different modulation schemes are applied to a higher frequency region and a lower frequency region on a subcarrier of the first signal A sub-field.

15 Claims, 11 Drawing Sheets

FIG. 10

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Output | 0 | 8 | 4 | 12 | 2 | 10 | 6 | 14 | 1 | 9 | 5 | 13 | 3 | 11 | 7 | 15 |

METHOD FOR TRANSMITTING AND RECEIVING WIRELESS SIGNAL IN WIRELESS COMMUNICATION SYSTEM AND APPARATUS FOR THE SAME

CROSS-REFERENCE TO RELATED APPLICATIONS

This application claims the benefit of priority of Korean Patent Application No. 10-2011-0125794 filed on Nov. 29, 2011, which is incorporated by reference in its entirety herein.

BACKGROUND OF THE INVENTION

1. Field of the Invention

The present invention relates to a wireless communication system, and more particularly, to a method for transmitting and receiving a wireless signal in a wireless local area network (WLAN) system and an apparatus for the same.

2. Related Art

Recently, various wireless communication technologies are under development in accordance with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

A technology related to a WLAN system has been spotlighted as a wireless communication technology providing a high speed data service in an unauthorized band. Particularly, unlike an existing cellular communication system, when an access point (AP) serving as a base station is connected only to a wired network including a distribution system and a power supply, the access point may be easily installed by anyone, has a cheap cost, and may perform data communication. Therefore, the access point has been generalized.

After the institute of electrical and electronics engineers (IEEE) 802 which is a standardization organization of a WLAN technology was established on February, 1980, a number of standardization operations have been conducted. An initial WLAN technology has supported a speed of 1 to 2 Mbps in frequency hopping, spread spectrum, infrared communication, or the like, using a frequency of 2.4 GHz through the IEEE 802.11. Recently, a speed up to 54 Mpbs may be supported by applying orthogonal frequency division multiplex (OFDM). In addition, in the IEEE 802.11, various technology standards such as improvement of quality of service (QoS), access point protocol compatibility, security enhancement, radio resource measurement, wireless access for a vehicular environment, fast roaming, a mesh network, interworking with an external network, wireless network management, and the like, have been put to practical use or have been developed. In addition, as a technology specification relatively recently established in order to overcome a limitation for a communication speed that has been pointed out as a disadvantage in the WLAN, there is an IEEE 802.11n. An object of the IEEE 802.11n is to increase a speed and reliability of a wireless network and extend an operating distance of the wireless network. More specifically, the IEEE 802.11n is based on multiple inputs and multiple outputs (MIMO) technology in which multiple antennas are used at both of a transmitting end and a receiving end in order to support a high throughput (HT) having a maximum data processing speed of 540 Mbps or more, minimize a transmission error, and optimize a data speed. Further, in this specification, a coding scheme of transmitting several overlapped duplicates may be used in order to increase data reliability, and an orthogonal frequency division multiplexing (OFDM) scheme may also be used in order to increase a speed.

The WLAN system has been continuously evolved so as to support a higher data rate and throughput. Therefore, the importance of backward compatibility between a protocol defined in an existing WLAN system and a protocol suggested in the next generation WLAN system has been demanded. As an example, the next generation WLAN system suggests a new frame format supporting the backward compatibility so that both of a legacy apparatus and a wireless apparatus that is to be newly introduced data may receive and obtain data.

Meanwhile, the support of the backward compatibility may deteriorate processing efficiency of a wireless signal in the wireless apparatus to cause deterioration in performance. This may be generated in view of transmission and reception of the wireless signal through the new frame format. Therefore, a needs exists for an advanced method for transmitting and receiving a wireless signal in which the above-mentioned problem is considered.

SUMMARY OF THE INVENTION

The present invention provides a method for transmitting and receiving a wireless signal capable of supporting backward compatibility in a WLAN system and preventing deterioration of a throughput in the entire system.

In an aspect, a method for receiving a data frame by a receive station in a wireless local area network (WLAN) system is provided. The method includes: receiving a signal A field including a multiple input multiple output (MIMO) indicator and including a first signal A sub-field and a second signal A sub-field each transmitted as different orthogonal frequency division multiplexing (OFDM) symbols; determining a processing type of a subsequently transmitted signal based on the signal A field; receiving a data field; and obtaining data by interpreting the data field based on the processing type of the signal. Different modulation schemes are applied to a higher frequency region and a lower frequency region on a subcarrier of the first signal A sub-field.

A quadrature binary phase shift keying (Q-BPSK) modulation scheme may be applied to the higher frequency region of the first signal A sub-field, and a BPSK modulation scheme may be applied to the lower frequency region of the first signal A sub-field.

The determining of the processing type of the signal based on the signal A field may include: fast Fourier transforming the signal A field; comparing a real part and an imaginary part of a constellation mapped signal configuring the fast Fourier transformed signal A field with each other; and determining that a very high throughput (VHT) scheme is the processing type of the signal when energy of the imaginary part of the constellation mapped signal is larger than that of the real part thereof.

The determining of the processing type of the signal based on the signal A field may includes determining that a legacy scheme is the processing type of the signal when the energy of the real part of the constellation mapped signal is larger than that of the imaginary part thereof.

The BPSK modulation scheme may be applied to the higher frequency region of the second signal A sub-field, and the Q-BPSK modulation scheme may be applied to the lower frequency region of the second signal A sub-field.

The method may further include receiving a signal B field including a modulation and coding scheme (MCS) indicator indicating an MCS applied to the data field. The second signal A sub-field may include a coding scheme indicator indicating an encoding scheme applied to the data field.

The obtaining the data by interpreting the data field may include fast Fourier transforming the data field; demodulating a constellation mapped signal configuring the fast Fourier transformed data field based on the MSC indicated by the MSC indicator; decoding the demodulated data field, corresponding to the encoding scheme indicated by the coding scheme indicator; and obtaining the data from the decoded data field.

In another aspect, a wireless apparatus is provided. The wireless apparatus includes: a radio frequency (RF) unit transmitting and receiving a wireless signal; and a processor operated by being functionally coupled to the RF unit. The processor includes a fast Fourier transform (FFT) unit, a very high throughput (VHT) detecting unit, a constellation demapper unit, and a decoder. The RF unit receives a signal A field including an MIMO indicator and a data field, the signal A field including a first signal A sub-field and a second signal A sub-field each transmitted as different OFDM symbols. The processor is configured to: fast Fourier transform the signal A field in the FFT unit; determine a processing type of a subsequently transmitted signal based on the fast Fourier transformed signal A field in the VHT detecting unit; and demodulate and decode the data in the constellation demapper unit and the decoder. Different modulation schemes are applied to a higher frequency region and a lower frequency region on a subcarrier of the first signal A sub-field.

A Q-BPSK modulation scheme may be applied to the higher frequency region of the first signal A sub-field, and a BPSK modulation scheme may be applied to the lower frequency region of the first signal A sub-field.

The determining of the processing type of the signal based on the signal A field in the VHT detecting unit may include: comparing a real part and an imaginary part of a constellation mapped signal configuring the fast Fourier transformed signal A field with each other; and determining that a VHT scheme is the processing type of the signal when energy of the imaginary part of the constellation mapped signal is larger than that of the real part thereof.

In still another aspect, a method for transmitting a data frame by a transmit station in a WLAN is provided. The method includes: transmitting a signal A field including an MIMO indicator and including a first signal A sub-field and a second signal A sub-field each transmitted as different OFDM symbols; transmitting a signal B field including control information required for interpretation of a data field; and transmitting the data field including data. Different modulation schemes may be applied to a higher frequency region and a lower frequency region on a subcarrier of the first signal A sub-field.

A Q-BPSK modulation scheme may be applied to the higher frequency region of the first signal A sub-field, and a BPSK modulation scheme may be applied to the lower frequency region of the first signal A sub-field.

The signal B field may include an MCS indicator indicating an MCS applied to the data field.

The second signal A sub-field may include a coding scheme indicator indicating an encoding scheme applied to the data field.

The BPSK modulation scheme may be applied to the higher frequency region of the second signal A sub-field, and the Q-BPSK modulation scheme may be applied to the lower frequency region of the second signal A sub-field.

BRIEF DESCRIPTION OF THE DRAWINGS

FIG. 10 is a diagram showing an example of a 16 point FFT input/output.

DESCRIPTION OF EXEMPLARY EMBODIMENTS

Figure 1:
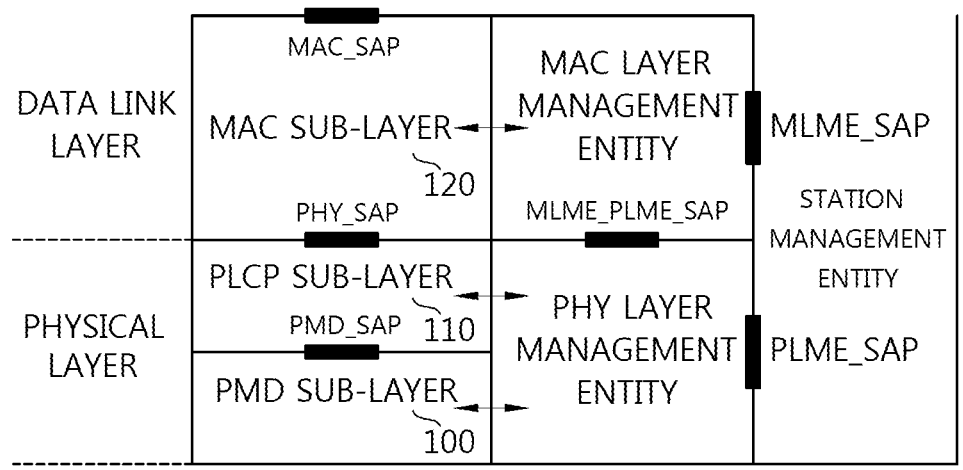
FIG. 1 is a diagram showing a physical layer architecture of the IEEE 802.11.

Hereinafter, exemplary embodiments of the present invention will be described in detail with reference to the accompanying drawings. An exemplary embodiment to be described below may be usefully applied to transmission and reception of a wireless signal on a wireless local area network (WLAN) supporting a very high throughput (VHT). However, the following exemplary embodiment is not applied only to the VHT WLAN system, but may also be applied to a general wireless communication system supporting transmission and reception of a wireless signal based on an orthogonal frequency division multiplexing (OFDM).

The wireless local area network (WLAN) to which the exemplary embodiment of the present invention may be applied includes one or more basic service set (BSS). The BSS, which is a set of stations (STA) successfully synchronized with each other to communicate with each other, is not a concept indicating a specific area.

An infrastructure BSS includes one or more non-AP station (non-AP STA1, non-AP STA2, non-AP STA3, non-AP STA4, non-AP STA5), an access point (AP) providing a distribution service, and a distribution system (DS) connecting a plurality of APs to each other. In the infrastructure BSS, the AP manages the non-AP STAs of the BSS.

On the other hand, an independent BSS (IBSS) is a BSS operating in an Ad-hoc mode. Since the IBSS does not include the AP, there is not centralized management entity performing a management function at the center. That is, in the IBSS, the non AP STAs are managed in a distributed manner. In the IBSS, all the STAs may be formed of a mobile STA, and forms a self-contained network since an access to DS is not permitted.

The STA, which is any function entity including a medium access control (MAC) according to a specification of the IEEE 802.11 standard and a physical layer interface for a wireless medium, includes both of the AP and the non-AP station in a wide sense.

The non-AP STA, which is a STA that is not the AP, may also be called other names such as a mobile terminal a wireless device, a wireless transmit/receive unit (WTRU), a user equipment (UE), a mobile station (MS), a mobile subscriber unit, a user, or the like. Hereinafter, for convenience of explanation, the non-AP STA will be called the STA.

The AP is a function entity providing an access to the DS via a wireless medium for the STA associated with a corresponding AP. Communication between the STA in the infrastructure BSS including the AP is made via the AP in principle. However, in the case in which a direct link is set, communication may be directly made between the STAs. The AP may also be called a central controller, a base station (BS), a node-B a base transceiver system (BTS), a side controller, or the like.

A plurality of infrastructure BSSs including the BSS may be connected to each other through a distribution system (DS). The plurality of BSS connected to each other through the DS is called an extended service set (ESS). The AP and/or the STAs included in the ESS may communicate with each other, and the STA may move from one BSS to another BSS while seamlessly communicating in the same ESS.

FIG. 1 is a diagram showing a physical layer architecture of the IEEE 802.11.

The physical layer (PHY) architecture of the IEEE 802.11 includes a PHY layer management entity (PLME), a physical layer convergence procedure (PLCP) sub-layer 110, and a physical medium dependent (PMD) sub-layer 100. The PLME provides a management function of a physical layer in cooperation with an MAC layer management entity (MLME). The PLCP sub-layer 110 transfers an MAC protocol data unit (MPDU) received from the MAC sub-layer 120 to the PMD sub-layer 100 or transfers a frame coming from the PMD sub-layer 100 to the MAC sub-layer 120 according to instruction of the MAC layer, between the MAC sub-layer 120 and the PMD sub-layer 100. The PMD sub-layer 100, which is a lower layer of the PLCP, may allow a physical layer entity to be transmitted and received between two stations through a wireless medium. The MPDU transferred from the MAC sub-layer 120 is called a physical service data unit (PSDU) in the PLCP sub-layer 110. The MPDU is similar to the PSDU. However, when an aggregated MPUD in which a plurality of MPDUs are aggregated is transferred, individual MPDUs and PSDUs may be different.

The PLCP sub-layer 110 adds an additional field including information required by a physical layer transceiver during a process of receiving the PSDU from the MAC sub-layer 120 and transferring the PSDU to the PMD sub-layer 100. Here, the field added to the MPDU may be a PLCP preamble, a PLCP header, tail bits required on a data field, or the like. The PLCP preamble serves to allow a receiver to prepare a synchronization function and antenna diversity before the PSDU is transmitted. The PLCP header includes a field including information on a PPDU to be transmitted, which will be described below in more detail with reference to FIG. 2.

The PLCP sub-layer 110 adds the above-mentioned field to the PSDU to generate the PPDU and transmit the PPDU to a receive station through the PDM sub-layer, and the receive station receives the PPDU and obtains information required for reconstructing data from the PLCP preamble and the PLCP header to reconstruct the data.

Figure 2:
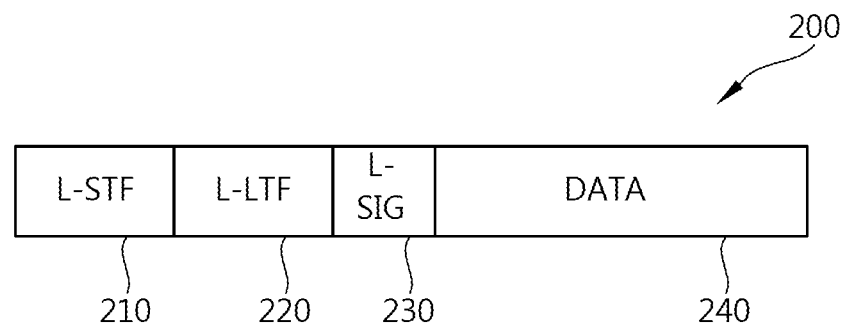
FIG. 2 is a block diagram showing a PPDU format according to the IEEE 802.11a/g standard.

FIG. 2 is a block diagram showing a PPDU format according to the IEEE 802.11a/g standard.

Referring to FIG. 2, the PPDU 200 includes an L-STF 210, an L-LTF 220, an L-SIG field 230, and an L-data field 240. The L-STF 210 is used for frame timing acquisition, automatic gain control (ACG) convergence, coarse frequency offset estimation, and the like.

The L-LTF 220 is used for fine frequency offset and channel estimation.

The L-SIG field 230 includes control information for demodulating and decoding the data field 240.

The data field 240 includes data that a transmit STA is to transmit to a receive STA. The data field includes a service field for initializing a scrambler in the PSDU transferred in the MAC layer, a tail field for initializing a convolution encoder to a zero state, and padding bits for adjusting an octet specification of a transmitted data field.

In a WLAN system based on OFDM, in the case of a WLAN system based on the IEEE 802.11n standard (a high throughput (HT)-WLAN system), a PPDU of a mixed format in which several fields are added to a legacy PPDU (L-PPDU) as shown in FIG. 2 is used in order to transmit data at a high speed. This is called an HT-mixed PPDU. The HT-mixed PPDU has a frame format capable of supporting coexistence of an HT-STA supporting HT and an L-STA in an HT WLAN system.

Figure 3:
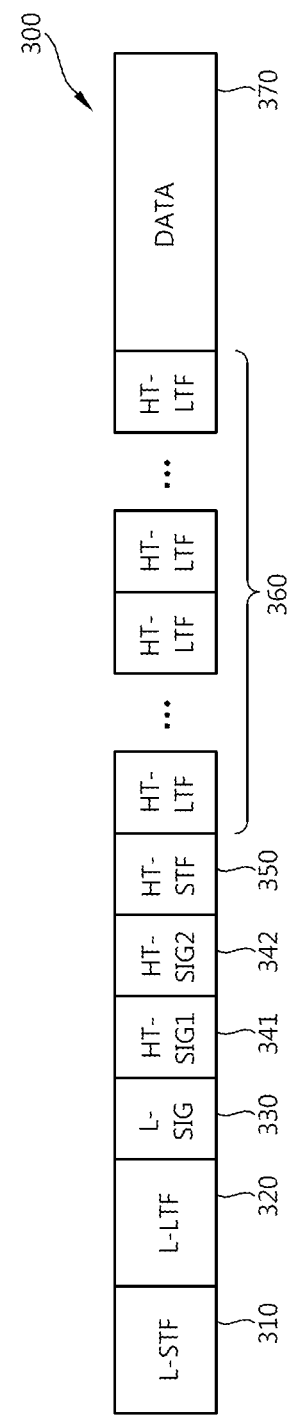
FIG. 3 is a block diagram showing an HT-complex PPDU format according to the IEEE 802.11n standard.

FIG. 3 is a block diagram showing an HT-complex PPDU format according to the IEEE 802.11n standard.

Referring to FIG. 3, the HT-mixed PPDU 300 includes an L-STF 310, an L-LTF 320, an L-SIG field 330, an HT-SIG field 340, an HT-STF 350, a plurality of HT-LTFs 360, and a data field 370.

The L-STF 310, the L-LTF 320, and the L-SIG field 330 are the same as those indicated by reference numerals 210, 220, and 230 of FIG. 2, respectively. Therefore, even though the L-STA receives the HT-mixed PPDU 220, the data field may be interpreted through the L-STF 310, the L-LTF 320, and the L-SIG field 330. However, the L-LTF field 320 may further include information for channel estimation to be performed by the HT-STA in order to receive the HT-mixed PPDU 300 and decrypt the L-SIG field 330, the HT-SIG field 340, and the HT-STF 350.

The HT-STA may recognize that the HT-mixed PPDU 300 is a PPDU for the HT-STA through the HT-SIG field 340 subsequent to the L-SIG field 330 and demodulate and decode the data field 370 based on it. The HT-SIG field may be divided into an HT-SIG1 field 341 and an HT-SIG2 field 342 and transmitted, wherein each of the HT-SIG1 field 341 and the HT-SIG2 field 342 may be transmitted as one OFDM symbol.

The HT-STF 350 may be used for frame timing synchronization for the HT-STA, AGC convergence, and the like.

The HT-LTF 360 may be used for channel estimation for demodulating the data field 370. Since the IEEE 802.11n supports SU-MIMO, the HT-LTF 360 may be configured in plural in order to estimate channels with respect to each of the data fields transmitted as a plurality of space streams.

The HT-LTF 360 may be configured of a data HT-LTF used for channel estimation for the space stream and an extension HT-LTF additionally used for full channel sounding. Therefore, the number of plurality of HT-LTFs 360 is equal to or larger than that of transmitted space streams.

The L-STF 310, the L-LTF 320, and the L-SIG field 330 are first transmitted in order that the L-STA also receives the HT-mixed PPDU 300 to obtain the data. Then, the HT-SIG field 340 is transmitted in order to demodulate and decode data transmitted for the HT-STA.

The L-STF 310 to the HT-SIG field 340 are transmitted without performing beamforming to allow the L-STA and the HT-STA to receive a corresponding PPDU and obtain data, and the HT-STF 350, the HT-LTF 360, and the data field 370 transmitted subsequently to the HT-SIG field 340 are transmitted as a wireless signal through pre-coding. Here, the HT-STF 350 is transmitted and a plurality of HT-LTFs 360 and the data field 370 are then transmitted so as to consider that power is varied due to the pre-coding in an STA receiving the wireless signal through the pre-coding.

Figure 4:
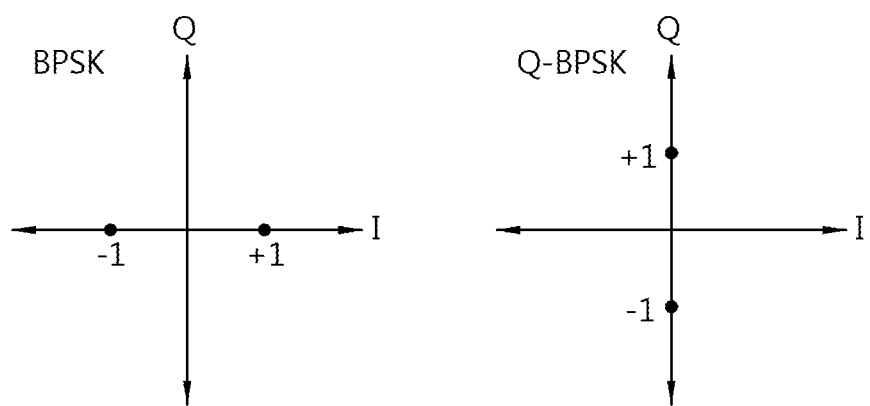
FIG. 4 is a diagram showing an example of constellation mapping applied to an L-SIG field.

The HT-mixed PPDU 300 maintains the same frame format as that of the L-PPDU 220 from the L-STF 310 to the HT-SIG field 340 in order to maintain compatibility. However, a quadrature-binary phase shift keying (Q-BPSK) modulation scheme in which a phase is shift by 90 degrees in a BPSK modulation scheme that has been applied to the L-SIG field 330 is applied to the HT-SIG field 340 in order to inform that an HT signal is transmitted. That is, the HT-SIG field is transmitted through the Q-BPSK modulation scheme. This may be referred to the BPSK modulation scheme applied to the L-SIG field and the Q-BPSK modulation scheme applied to the HT-SIG field which are shown in FIG. 4.

The receive STA performs the fast Fourier transform (FFT) on a received OFDM signal, compares energy of an I-phase component and energy of a Q-phase component with each other when a value of the HT-SIG field is received in a state in which channel compensation is completed, and detects the HT signal when it is indicated that the Q-phase component is larger than the I-phase component.

Unlike the IEEE 802.11n standard supporting the HT, the next generation WLAN system requires a higher throughput. It is called a very high throughput (VHT) unlike the HT and supports transmission of a bandwidth of 80 MHz and/or transmission of a bandwidth of 80 MHz or more (for example, 160 MHz). In addition, it supports a multi user-multiple input multiple output (MU-MIMO) transmission method.

An amount of control information transmitted to the STAs for the MU-MIMO transmission may be relatively larger than that of IEEE 802.11n control information. For example, the number of space streams that each STA is to receive and modulation and coding information, or the like, of data transmitted for each STA may correspond to control information additional required in a VHT WLAN system. Therefore, in the case of perform the MU-MIMO transmission in order to simultaneously provide data service to a plurality of receive STAs, control information that is to be transmitted may be increased according to the number of receive STAs.

In order to efficiently transmit the control information having an increased transmission amount, the control information required for the MU-MIMO transmission may be divided into common control information commonly required for all STAs and dedicated control information individually required for the STAs and then transmitted.

A VHT-PPDU format used in the VHT-WLAN system supporting the MU-MIMO will be described with reference to FIG. 5.

Figure 5:
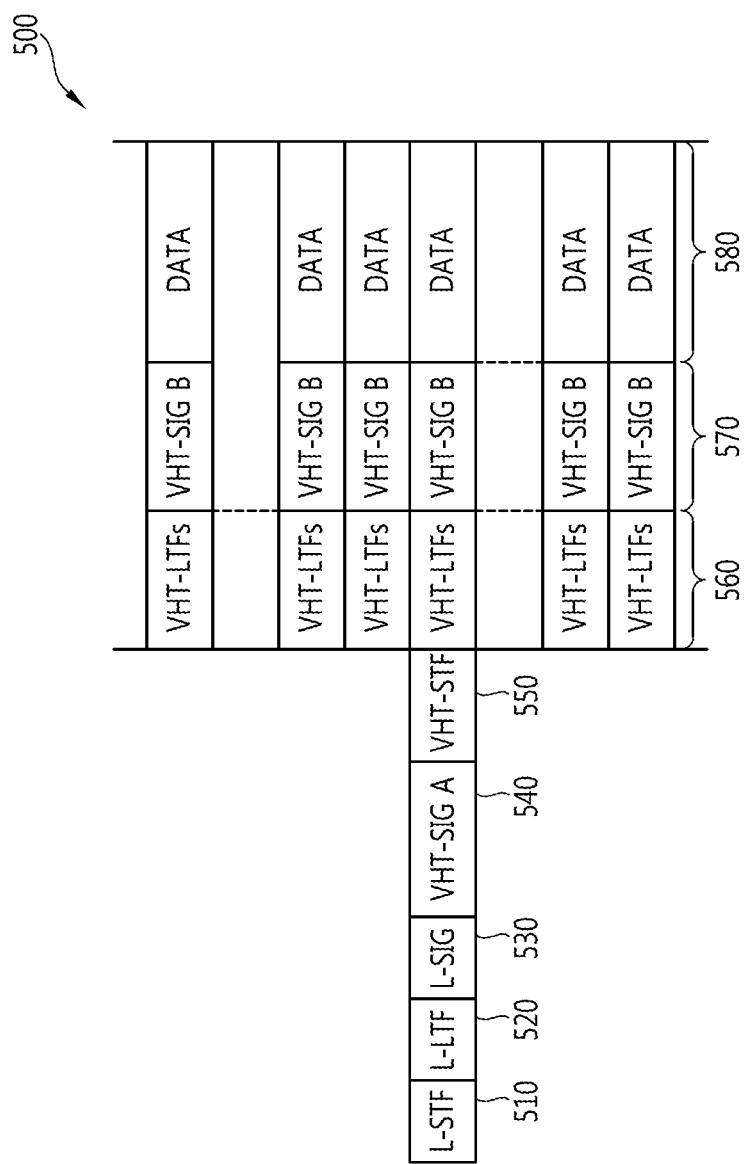
FIG. 5 is a block diagram showing a VHT-PPDU format according to an exemplary embodiment of the present invention.

FIG. 5 is a block diagram showing a VHT-PPDU format according to an exemplary embodiment of the present invention.

Referring to FIG. 5, the VHT-PPDU 500 may include an L-STF 510, an L-LTF 520, an L-SIG field 530, a VHT-SIGA field 540, a VHT-STF 550, a VHT-LTF 560, a VHT-SIGB field 570, and a data field 580.

The PLCP sub-layer adds required information to the PSDU transferred from the MAC layer to convert the PSDU into the data field 580 and adds the L-STF 510, the L-LTF 520, the L-SIG field 530, the VHT-SIGA field 540, the VHT-STF 550, the VHT-LTF 560, and the VHT-SIGB field 570, or the like, to the data field 580 to generate the VHT-PPDU 500 and transmit the generated VHT-PPDU 500 to one or more STA through the PDM layer.

The L-STF 510 is used for frame timing acquisition, automatic gain control (ACG) convergence, coarse frequency acquisition, or the like.

The L-LTF 520 is used for channel estimation for demodulation of the L-SIG field 530 and the VHT-SIGA field 540.

The L-SIG field 530 is used for the L-STA to receive the PPDU to obtain data.

The VHT-SIGA field 540, which is common control information required in the VHT-STAs MIMO-paired with the AP, includes control information for interpreting the received VHT-PPDU 500. The VHT-SIGA field 540 includes information on space streams for each of a plurality of MIMO-paired STAs, bandwidth information, identification information related to whether or not space time block coding (STBC) is used, identification information (group identifier) on an STA group, information on the STAs allocated with each group identifier, and short guide interval (GI) related information. Here, the identification information (group identifier) on an STA group may include information whether a currently used MIMO transmission method is MU-MIMO or SU-MIMO.

The VHT-STF 550 is used to improve performance of AGC estimation in the MIMO transmission.

The VHT-LTFs 560 are used for the STA to estimate MIMO channels. Since the VHT WLAN system supports the MU-MIMO, the VHT-LTFs 560 may be set by the number of space streams in which the VHT-PPDU 500 is transmitted. Additionally, full channel sounding is supported. In this case, the number of VHT LTFs may be further increased.

The VHT-SIGB field 570 includes dedicated control information required for the plurality of MIMO-paired STAs to receive the VHT-PPDU 500 to obtain the data. Therefore, only in the case in which common control information included in the VHT-SIGA field 560 indicates that the currently received VHT-PPDU 500 is MIMO-transmitted, the STA may be designed to decode the VHT-SIGB field 570. To the contrary, in the case in which the common control information indicates that the current received VHT-PPDU 500 is a VHT-PPDU for a single STA (including the SU-MIMO), the STA may be designed not to decode the VHT-SIGB field 570.

The VHT-SIGB field 570 includes information on modulation, encoding, and rate-matching of each STA. A size of the VHT-SIGB field 570 may be changed according to a type of MIMO transmission (MU-MIMO or SU-MIMO) and a bandwidth of a channel used for transmission of the PPDU.

The VHT-PPDU format as shown in FIG. 5 has been suggested in order to promote maximization of transmission efficiency while maintaining backward compatibility with the L-STA and the HT-STA.

The VHT-SIGA field 540 may be divided into a VHT-SIGA1 field 541 and a VHT-SIGA2 field 542 and transmitted as one OFDM symbol, respectively, similar to the HT-SIG field 440 of FIG. 4. Mapping of a subcarrier of a corresponding field may be referred to FIG. 6.

Figure 6:
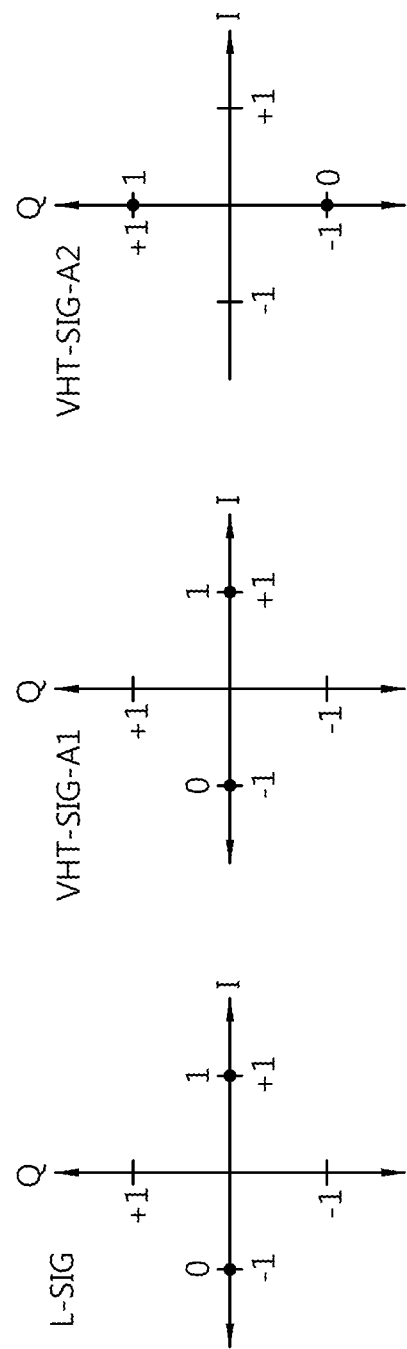
FIG. 6 is a diagram showing an example of constellation mapping of an L-SIG field, a VHT-SIGA1 field, and a VHT-SIGA2 field.

FIG. 6 is a diagram showing an example of constellation mapping of an L-SIG field, a VHT-SIGA1 field, and a VHT-SIGA2 field.

Referring to FIG. 6, a BPSK modulation scheme is applied to an L-SIG field and a VHT-SIGA1 field, and a Q-BPSK modulation scheme is applied to a VHT-SIGA2 field. In this case, since the VHT-SIGA1 field has the same constellation mapping as that of the L-SIG field, the STA may not recognize that a corresponding wireless signal is a signal for VHT only with reception of the VHT-SIGA1 field. Therefore, the STA performs analysis of the signal in a legacy scheme. Then, the STA recognizes that the corresponding wireless signal is the signal for VHT through a result of FFT mapping for a signal of the VHT-SIGA2 field and starts to analyze the signal in a VHT scheme. That is, it may be recognized that a time in point in which the signal is detected in the VHT scheme is during a period in which the VHT-STF is received through an antenna. The reason is that information on constellation mapping may be detected after the VHT-SIGA2 symbol is completely received and subjected to an FFT process and channel compensation is then performed.

Since the VHT-STF field, which is a field required for fine automatic gain control due to beamforming, or the like, is information operated using information in a time domain and then used for ACG, or the like, of a radio frequency (RF) end, in the case in which the signal detection in the VHT scheme is delayed, the AGC, or the like, is restricted by a delayed time. This may cause deterioration in performance of the entire WLAN system. Therefore, a method for transmitting and receiving a wireless signal allowing signal detection in a VHT scheme to more rapidly start is required.

In the above-mentioned HT, in order to detect a Q-BPSK signal in the HT-SIG field, according to the related art, FFT is performed on a received OFDM signal, energy magnitudes of an I-phase and a Q-phase are compared with each other when a value of the HT-SIG field is input in a state in which channel compensation is completed, and the signal detection in the HT scheme is performed based on this information in the case in which it is indicated that the Q-phase signal is larger than the I-phase signal. A receive end of a wireless apparatus implementing it is shown in FIG. 7.

Figure 7:
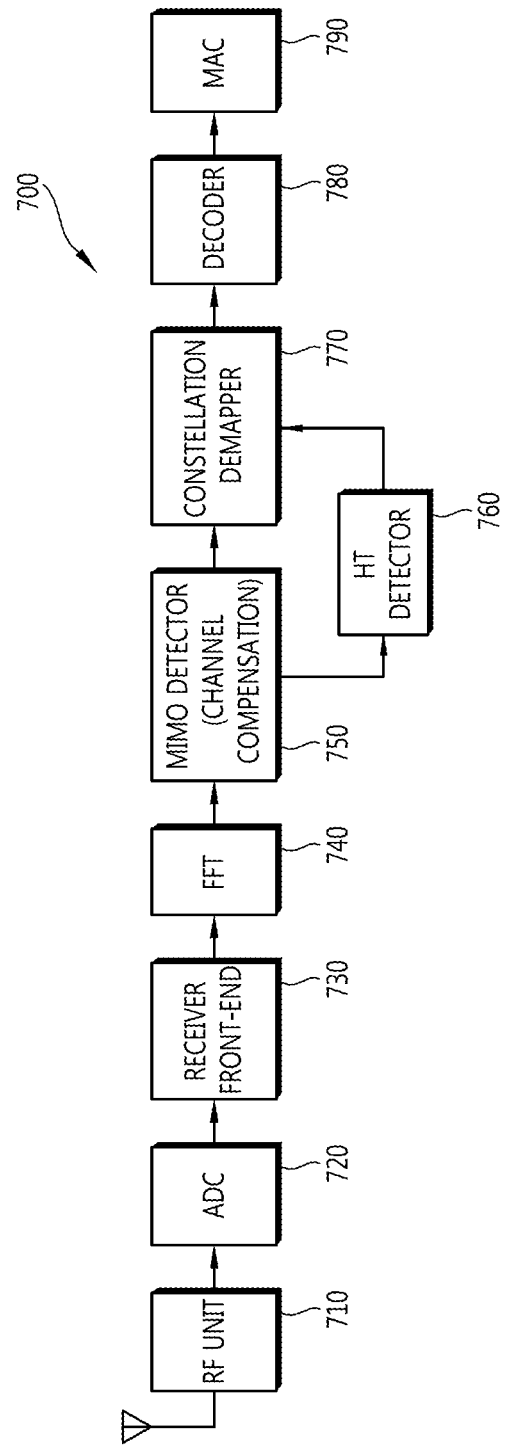
FIG. 7 is a block diagram showing a receive end of a wireless apparatus to which the exemplary embodiment of the present invention may be applied.

FIG. 7 is a block diagram showing a receive end of a wireless apparatus to which the exemplary embodiment of the present invention may be applied.

Referring to FIG. 7, the wireless apparatus 700 may be configured to include an RF unit 710, an analog to digital converter (ADC) 720, a receiver front-end 730, an FFT unit 740, an MIMO detector 750, an HT detector 760, a constellation demapper 770, a decoder 780, and an MAC 790.

The RF unit 710 receives a wireless signal transmitted from a transmit STA. The ADC 720 converts an analog signal received from the RF unit 710 into a digital signal. The receiver front-end 730 means a device between an antenna and an intermediate frequency (IF) stage. The FFT unit 740 performs FFT transforming a received signal in a time domain into a signal in a frequency domain. The MIMO detector 750 detects whether or not the received signal is a pre-coded and beamformed MIMO signal and performs channel compensation. The HT detector 760 detects whether the received signal is a signal in the HT scheme. The constellation demapper 770 demodulates a constellation mapped signal, corresponding to a corresponding modulation scheme. The decoder 780 performs decoding, corresponding to an encoding scheme applied to the received signal.

A signal processing scheme performed in the receive end as shown in FIG. 7 may be applied to the VHT scheme and the VHT-PPDU signal processing as shown in FIG. 5. Since the I-phase signal is larger than the Q-phase signal in the VHT-SIGA1 field, the detection of the VHT signal is not performed, and at the time of detection of HT after performing the FFT on the VHT-SIGA2 field, since the Q-phase signal is larger than the I-phase signal, the detection of the VHT signal may start in a corresponding time in point.

However, as described above, since the detection of the VHT signal starts after the VHT-SIGA2 field is completely received and the FFT and the channel compensation are performed, it is likely that the VHT-SFT is being received, which may cause the deterioration in performance of the WLAN system. Therefore, according to the exemplary embodiment of the present invention, it is required to apply a new type of modulation scheme to the VHT-SIGA field.

Figure 8:
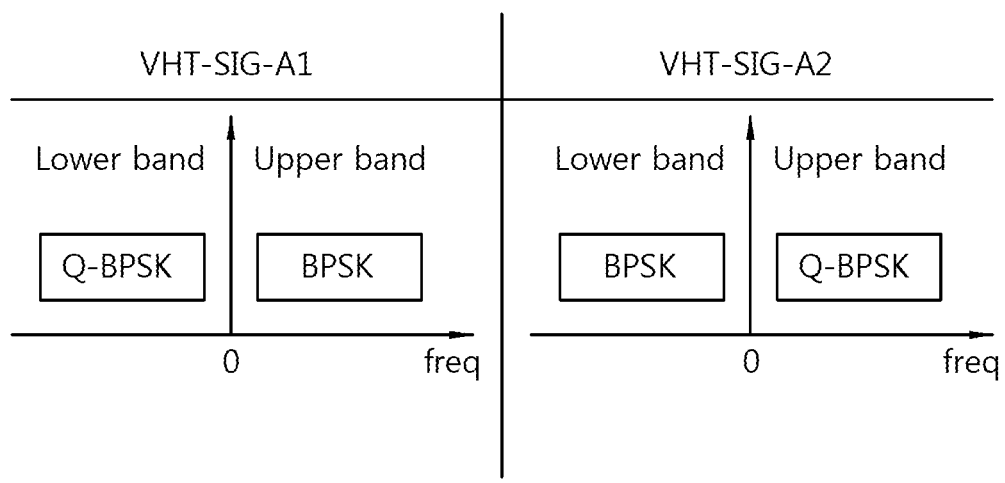
FIG. 8 is a diagram showing a structure of a VHT-SIGA field according to the exemplary embodiment of the present invention.

FIG. 8 is a diagram showing a structure of a VHT-SIGA field according to the exemplary embodiment of the present invention.

Referring to FIG. 8, it may be appreciated that a change is applied to constellation mapping on an OFDM symbol in a suggested VHT-SIGA field.

In the case of the VHT-SIGA1 field, a signal may be mapped by applying the BPSK scheme applied to a positive (+) frequency region on an OFDM subcarrier and applying the Q-BPSK scheme to a negative (−) frequency region thereon. To the contrary, in the case of the VHT-SIGA2 field, a signal may be mapped by applying the Q-BPSK scheme applied to the positive (+) frequency region and applying the BPSK scheme to the negative (−) frequency region. Meanwhile, BPSK/Q-BPSK mapping for positive (+)/negative (−) subcarriers of the VHT-SIGA1/2 fields may be applied conversely to an example of FIG. 8. That is, a sequence of the VHT-SIGA1/2 fields may also be changed.

In the case in which a structure of the VHT-SIGA field as described above is applied, a gain related to a hardware structure of the FFT may be obtained.

In the structure as shown in FIG. 8, constellation mapping is performed based on FFT results of the VHT-SIGA1, legacy/HT/VHT signals are detected using results of the constellation mapping, and decoding information on constellation is then transferred, thereby making it possible to an intended data value based on this value.

In the case of confirming all of the FFT output results and then determining a transmission scheme as in an existing signal processing scheme, the next OFDM symbol is already being received, it is difficult to secure a sufficient time. Therefore, the transmission scheme needs to be detected as rapidly as possible through minimal information. Otherwise, a large-sized buffer for temporally holding information of the next transmitted symbol is required, and processing using a high clock may also be required in order to process the information.

On the other hand, in the case of a symbol suggested in the present embodiment, when a wireless signal in a time domain input to a pipelined FFT having a decimation in frequency (DIF) structure is converted into a wireless signal in a frequency domain, output signals are output in a bit reverse order.

Figure 9:
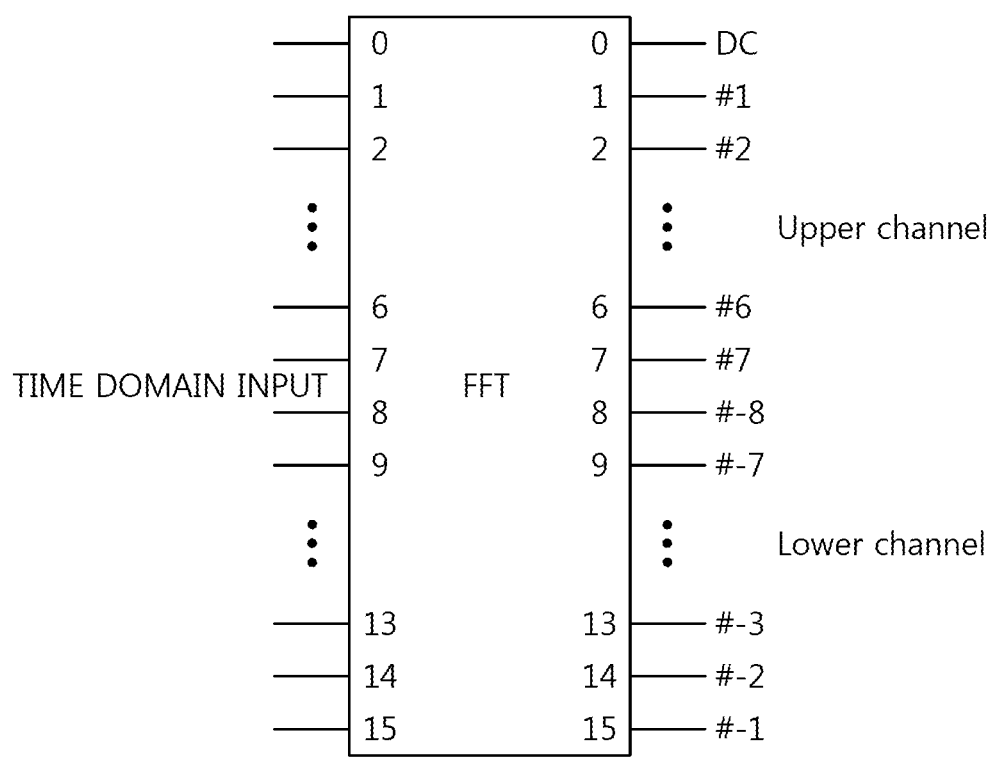
FIG. 9 is a diagram showing an example of a 16 point FFT input/output and a subcarrier index number.

FIG. 9 is a diagram showing an example of a 16 point FFT input/output and a subcarrier index number.

FIG. 10 is a diagram showing an example of a 16 point FFT input/output.

Referring to FIGS. 9 and 10, time domain signals sequentially input to an input of a pipelined FFT having a DIF structure are output for each subcarrier having a bit reverse form at the time of output. That is, at the time of using the pipeline FFT, one I/O signal is sequentially input in one clock input, OFDM symbol data in the time domain are completely input, and results for each subcarrier are output after a predetermined delay. The corresponding result corresponds to a result for a subcarrier index of the bit reverse order. In this case, in the bit reverse order, a subcarrier data value of a higher channel is output in an odd numbered output, and a subcarrier data value of a lower channel is output in an even numbered output. Therefore, the channel signals of the higher channel/the lower channel are alternately output.

Therefore, since it may be easily determined that data to which different modulation schemes are applied are present in the higher channel and the lower channel, magnitudes of the I-phase/Q-phase signals are compared with a previously output calculated signal or are compared with each other, through the channel compensation for the output signal without a reordering process, thereby making it possible to perform the detection of the VHT signal. In addition, after subcarriers corresponding to the desired number are used for detection, the signal processing in the VHT scheme may be performed.

In the case in which detection accuracy in the signal processing scheme is increased, a sufficient time is secure up to a time in point in which the VHT-SIGA2 signal is fast Fourier transformed and output, or buffering is possible, phase rotation information may be easily obtained using the same subcarrier of the VHT-SIGA1 field and the VHT-SIGA2 field as represented by the following Equations without channel compensation for each subcarrier. This may be referred to the following Equation 1 and Equation 2.

$$y_1 = hx_1 + n_1 \text{ for VHT-SIGA1}$$

$$y_2 = hx_2 + n_2 \text{ for VHT-SIGA2} \qquad \text{[Equation 1]}$$

That is, a matrix h related to a transmission channel is not changed, only x1 and x2 which are transmitted data are changed, and a correlation between y1 and y2 received by x1 having information on an I-phase and x2 having information on a Q-phase may be represented by the following Equation 2.

$$y_1^* \cdot y_2 = (hx_1 + n_1)^* \cdot (hx_2 + n_2) = \|h\|^2 x_1^* x_2 + h^* x_1^* n_2 + hx_2 n_1^* + n_1^* n_2$$

When calculating an expectation of the correlation value, since a term of a signal multiplied by additive white Gaussian noise (AWGN) may be approximated to 0, the term may be ignored. In addition, $x_1^* x_2$ value becomes an imaginary value since a subcarrier at the same position has different phases in tow symbols. In the case in which these several subcarriers are summed up, VHT signal rotation in which a channel state is reflected may be confirmed.

Figure 11:
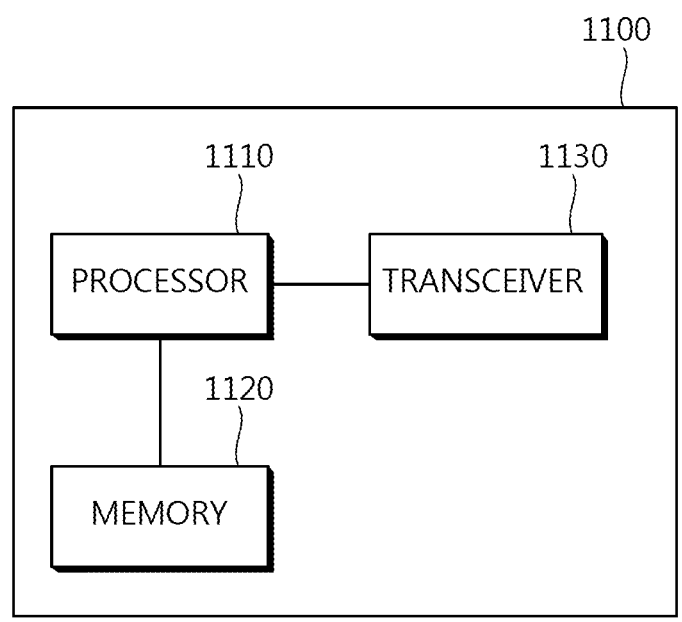
FIG. 11 is a block diagram showing a wireless apparatus in which the exemplary embodiment of the present invention may be implemented.

FIG. 11 is a block diagram showing a wireless apparatus in which the exemplary embodiment of the present invention may be implemented.

Referring to FIG. 11, the wireless device 1100 includes a processor 1110, a memory 1120, and a transceiver 1130. The transceiver 1130 transmits and/or receives a wireless signal and implements a physical layer of the IEEE 802.11. The processor may implement the RF unit 710 in the wireless apparatus shown in FIG. 7. The processor 1110 is functionally connected to the transceiver 1130, generates a data unit including a training symbol, a signal field, and a PSDU, and generates and transmits a PPDU including the training symbol, the signal field, and the PSDU. When the processor 1110 receives a wireless signal for a suggested PPDU, the processor 1110 is set to demodulate and decode the wireless signal to obtain data. The processor 1110 is set to implement an MAC layer and/or a PHY layer implementing the exemplary embodiment of the present invention shown in FIGS. 1 to 10. The processor 1110 may implement the ADC 710 to the MAC 790 in the wireless apparatus shown in FIG. 7.

The processors 1110 and/or the transceiver 1130 may include an application-specific integrated circuit (ASIC), other chipsets, logical circuits, and/or data processing apparatuses. When the embodiment is implemented by software, the above-mentioned method may be implemented by a module (process, function, or the like) that performs the above-mentioned function. The module may be stored in the memory 1120 and be executed by the processor 1110. The memory 1120 may be included inside the processor 1110 and may be separately disposed outside the process 1110 and be functionally connected to the processor 1110 by known various units.

As set forth above, according to the exemplary embodiments of the present invention, different constellation mappings are applied to a higher channel and a lower channel in detecting legacy/HT/VHT signals of an OFDM WLAN system, thereby making it possible to rapidly determine whether or not a signal is processed in a VHT scheme with a reverse order output of a pipeline FFT having a DIF structure. In addition, different mappings are also applied to a higher channel and a lower channel between a VHT-SIGA1 field and a VHT-SIGA2 field, thereby making it possible to improve accuracy of detection using channel information.

What is claimed is:

1. A method for receiving a data frame by a receive station in a wireless local area network (WLAN) system, the method comprising:
   receiving a signal A field including a multiple input multiple output (MIMO) indicator and including a first signal A sub-field and a second signal A sub-field each transmitted as different orthogonal frequency division multiplexing (OFDM) symbols;
   determining a processing type of a subsequently transmitted signal based on the signal A field;
   receiving a data field; and
   obtaining data by interpreting the data field based on the processing type of the signal,
   wherein different modulation schemes are applied to a higher frequency region and a lower frequency region on a subcarrier of the first signal A sub-field.

2. The method of claim 1, wherein a quadrature binary phase shift keying (QBPSK) modulation scheme is applied to the higher frequency region of the first signal A sub-field, and a BPSK modulation scheme is applied to the lower frequency region of the first signal A sub-field.

3. The method of claim 2, wherein the determining of the processing type of the signal based on the signal A field includes:
   fast Fourier transforming the signal A field;
   comparing a real part and an imaginary part of a constellation mapped signal configuring the fast Fourier transformed signal A field with each other; and
   determining that a very high throughput (VHT) scheme is the processing type of the signal when energy of the imaginary part of the constellation mapped signal is larger than that of the real part thereof.

4. The method of claim 3, wherein the determining of the processing type of the signal based on the signal A field includes determining that a legacy scheme is the processing type of the signal when the energy of the real part of the constellation mapped signal is larger than that of the imaginary part thereof.

5. The method of claim 2, wherein the BPSK modulation scheme is applied to the higher frequency region of the second signal A sub-field, and the Q-BPSK modulation scheme is applied to the lower frequency region of the second signal A sub-field.

6. The method of claim 3, further comprising receiving a signal B field including a modulation and coding scheme (MCS) indicator indicating an MCS applied to the data field,
   wherein the second signal A sub-field includes a coding scheme indicator indicating an encoding scheme applied to the data field.

7. The method of claim 6, wherein the obtaining the data by interpreting the data field includes:
   fast Fourier transforming the data field;

demodulating a constellation mapped signal configuring the fast Fourier transformed data field based on the MCS indicated by the MCS indicator;

decoding the demodulated data field, corresponding to the encoding scheme indicated by the coding scheme indicator; and obtaining the data from the decoded data field.

8. A wireless apparatus comprising:

a radio frequency (RF) unit transmitting and receiving a wireless signal; and a processor operated by being functionally coupled to the RF unit, wherein the processor includes a fast Fourier transform (FFT) unit, a very high throughput (VHT) detecting unit, a constellation demapper unit, and a decoder, wherein the RF unit receives a signal A field including a multiple input multiple output (MIMO) indicator and a data field, the signal A field including a first signal A sub-field and a second signal A sub-field each transmitted as different orthogonal frequency division multiplexing (OFDM) symbols, wherein the processor is configured to:

fast Fourier transform the signal A field in the FFT unit;

determine a processing type of a subsequently transmitted signal based on the fast Fourier transformed signal A field in the VHT detecting unit; and demodulate and decode the data in the constellation demapper unit and the decoder, and wherein different modulation schemes are applied to a higher frequency region and a lower frequency region on a subcarrier of the first signal A sub-field.

9. The wireless apparatus of claim 8, wherein a quadrature binary phase shift keying (Q-BPSK) modulation scheme is applied to the higher frequency region of the first signal A sub-field, and a binary phase shift keying (BPSK) modulation scheme is applied to the lower frequency region of the first signal A sub-field.

10. The wireless apparatus of claim 9, wherein the determining of the processing type of the signal based on the signal A field in the VHT detecting unit includes:

comparing a real part and an imaginary part of a constellation mapped signal configuring the fast Fourier transformed signal A field with each other; and determining that a VHT scheme is the processing type of the signal when energy of the imaginary part of the constellation mapped signal is larger than that of the real part thereof.

11. A method for transmitting a data frame by a transmit station in a wireless local area network (WLAN), the method comprising:

transmitting a signal A field including a multiple input multiple output (MIMO) indicator and including a first signal A sub-field and a second signal A sub-field each transmitted as different orthogonal frequency division multiplexing (OFDM) symbols;

transmitting a signal B field including control information required for interpretation of a data field; and transmitting the data field including data, wherein different modulation schemes are applied to a higher frequency region and a lower frequency region on a subcarrier of the first signal A sub-field.

12. The method of claim 11, wherein a quadrature binary phase shift keying (Q-BPSK) modulation scheme is applied to the higher frequency region of the first signal A sub-field, and a binary phase shift keying (BPSK) modulation scheme is applied to the lower frequency region of the first signal A sub-field.

13. The method of claim 12, wherein the signal B field includes a modulation and coding scheme (MCS) indicator indicating an MCS applied to the data field.

14. The method of claim 13, wherein the second signal A sub-field includes a coding scheme indicator indicating an encoding scheme applied to the data field.

15. The method of claim 12, wherein the BPSK modulation scheme is applied to the higher frequency region of the second signal A sub-field, and the Q-BPSK modulation scheme is applied to the lower frequency region of the second signal A sub-field.

\* \* \* \* \*